Figure 1:
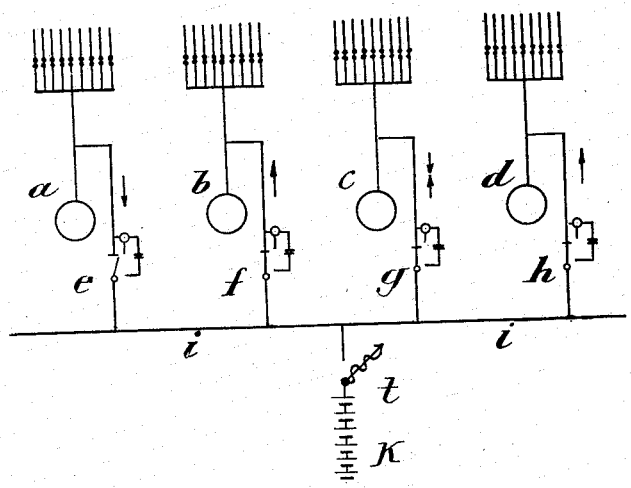

E. BRANDENBURG.
SECTIONING MEANS FOR ELECTRIC STATIONS PROVIDED WITH ACCUMULATORS.
APPLICATION FILED OCT. 2, 1911.

1,137,046.

Patented Apr. 27, 1915.
3 SHEETS—SHEET 1.

Witnesses:
K. O'Hara.
H. H. Smith.

Inventor:
Edwin Brandenburg
per Lawrence Langner
Attorney.

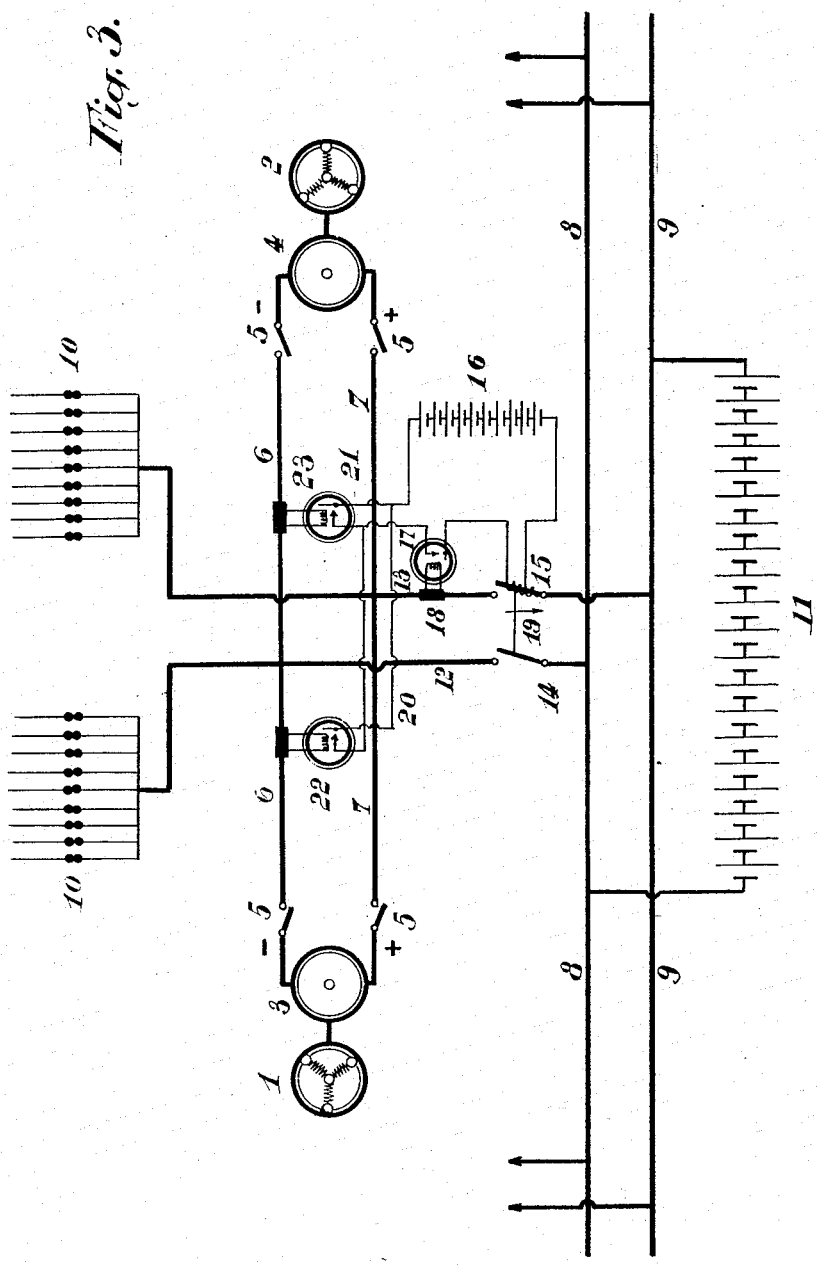

E. BRANDENBURG.
SECTIONING MEANS FOR ELECTRIC STATIONS PROVIDED WITH ACCUMULATORS.
APPLICATION FILED OCT. 2, 1911.
1,137,046.
Patented Apr. 27, 1915
3 SHEETS—SHEET 3.
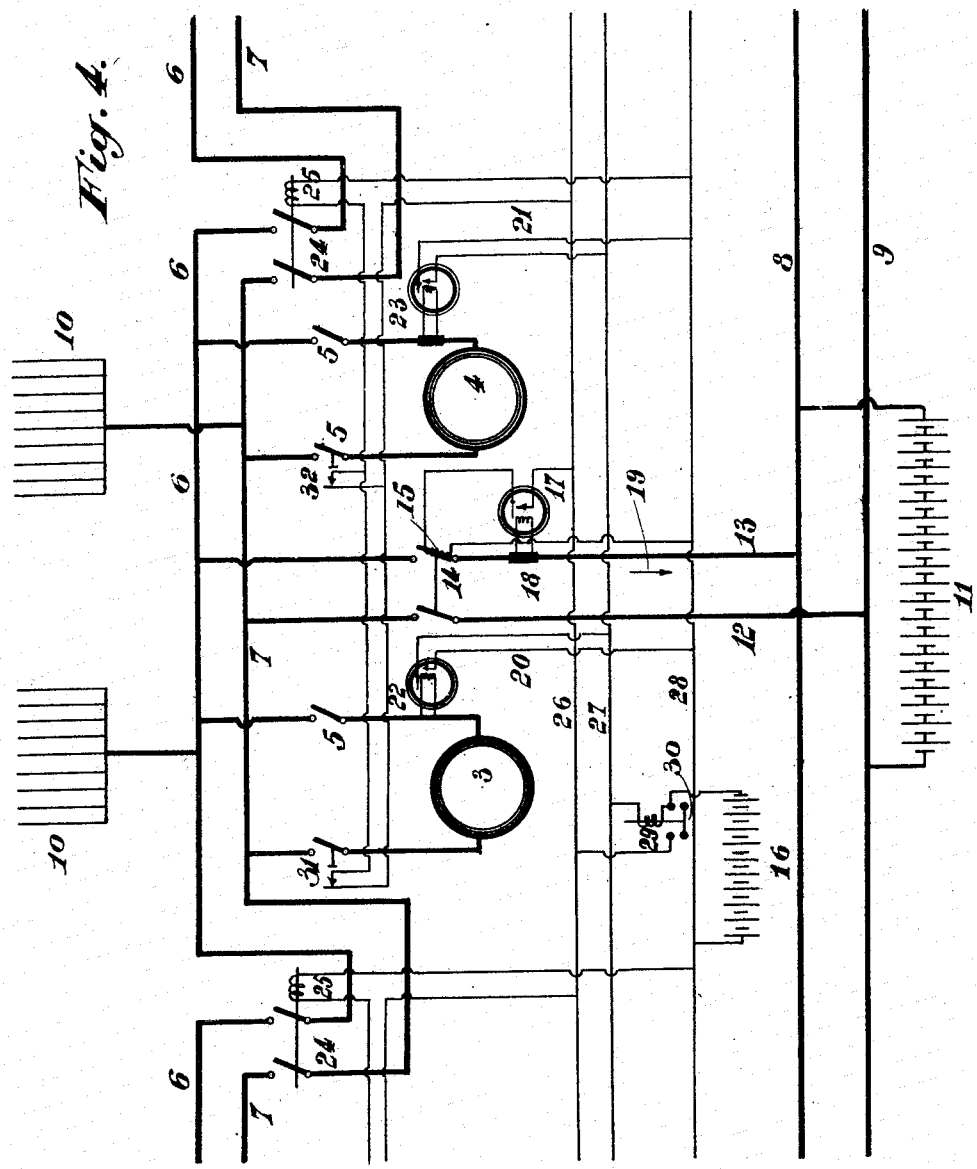

UNITED STATES PATENT OFFICE.

EDWIN BRANDENBURG, OF BRUSSELS, BELGIUM.

SECTIONING MEANS FOR ELECTRIC STATIONS PROVIDED WITH ACCUMULATORS.

1,137,046. Specification of Letters Patent. Patented Apr. 27, 1915.

Application filed October 2, 1911. Serial No. 652,316.

*To all whom it may concern:*

Be it known that I, EDWIN BRANDENBURG, a subject of the King of Belgium, residing at 14 Rue d'Estouvelle, Brussels, in the Kingdom of Belgium, have invented certain new and useful Improvements in Sectioning Means for Electric Stations Provided with Accumulators, of which the following is a specification.

My co-pending application 652,315 has for its object to subdivide the installation of central stations into different sections each comprising one or more dynamos and to isolate these sections automatically one from the other in case of accident to one of the dynamos in such a manner that disturbances and eventual interruption in the supply of the current to the mains may be confined to the defective section.

The present invention has for its object to avoid this partial stoppage or to minimize these disturbances in the supply of current to the mains in works such as central continuous current stations and in sub-stations for transforming alternating current into continuous current where batteries of accumulators can operate in parallel with the dynamos and in case of an accident, rendering these batteries operative automatically to supply the defective section with current. In order to enable the battery to supply its current to the defective section automatically and instantaneously without operating charging and discharging switches it is obviously necessary to isolate it from the sound sections as otherwise the counter E. M. F. experienced by the latter upon the battery connections would prevent vigorous discharge from them; as however, these sections must normally feed the battery it is essential that the connection between the latter and the sections should only be interrupted in case one or other of the dynamo units that these sections comprise is over loaded. In accordance with the present invention this object is attained by the provision, in the circuit which connects the section with the battery of accumulators, of an automatic isolating interrupter the operating solenoid of which is mounted in an independent circuit comprising a reversing relay which only closes upon the passage of a current proceeding from the section to the battery of accumulators and a maximum relay which operates only when the intensity of the current of the dynamos of the section exceeds a given value. In order that the automatic isolating interrupter may open it is therefore necessary that the current supplied by the dynamo or dynamos should have an intensity exceeding this limit value and also that it should be proceeding from the section toward the battery the interrupter remaining closed for all discharge current from the battery into the section. The connection of the dynamos of the installation by means of bus bars provided with automatic sectioning interrupters, the operation of which is controlled by maximum relays actuated by the current of the dynamos serves (at times of small consumption when the dynamos of one of the sections are utilized for supplying the feeders of one or more other sections the dynamos of which are inoperative) to prevent these latter sections from remaining connected (if they are sound) with the battery of accumulators, the result of which would be that the latter in addition to having to serve the defective section would have to serve all the sections the dynamos of which were inoperative so that it would very rapidly be exhausted. Now this would inevitably occur if the dynamos of the installation were not connected by section bars because in this case if an accident to one of the running dynamos took place the automatic interrupters of the sound sections, the dynamos of which were running, would be the only ones which would be disconnected while the sections, dynamos of which were stopped, would remain connected with the battery the current traversing them being constantly directed from the discharge bus bar of the battery hereinafter termed exchange bars toward the feeders. If, however, the dynamos of the various sections are connected one with the other by bus bars in accordance with my copending application #652,315 the sectioning interrupters corresponding to the dynamos that are stopped cannot open because their operation is controlled by maximum relays actuated by the current of these dynamos in such a manner that if the dynamos of any section supply the adjacent section, the dynamos of which are stopped the two sections will remain connected by the section bus bars even in case of overload. Consequently if one of the dynamos should stop as the result of an accident the dynamos of the sound sections continue to send their current through the section bus bars into the sections that they supply in such a manner that the current which circulates in the latter is then directed from the section toward the battery which permits of the disconnection of the corresponding isolating interrupter. Thus the battery of accumulators will only have to furnish its current to the defective section and to those which were previously served by the latter. Nevertheless in exceptional cases of constant supply installations where the same number of dynamos are always running in conjunction the section bus bars can be dispensed with.

The accompanying drawings show clearly the two characteristic forms of the present invention.

Figure 2:
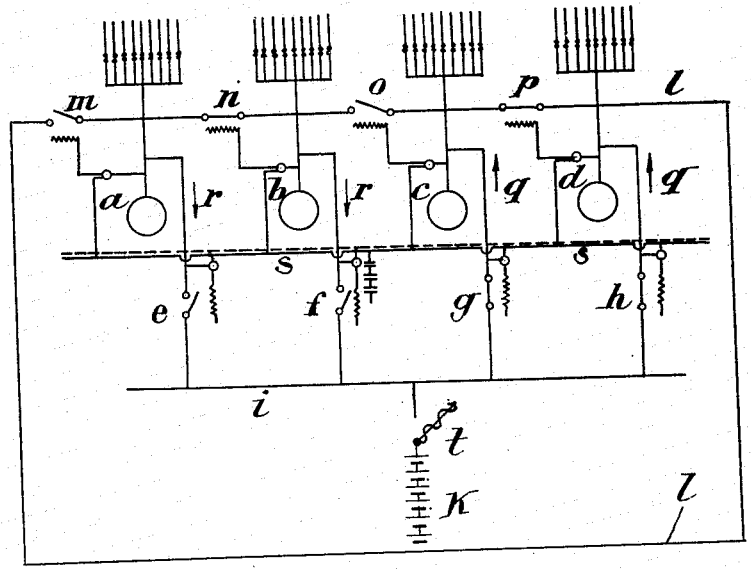

Figure 1 is a diagrammatic view showing an installation comprising four dynamos connected by an exchange bus bar with a battery of accumulators but not connected with each other by section bars. Fig. 2 is a general view of an installation, the four dynamos of which are connected on the one hand with the battery of accumulators by an exchange bar, and on the other hand one with the other by section bus bars provided with section interrupters. Fig. 3 is a more detailed diagrammatic view showing the device for disconnecting the interrupter for isolating a section in cases in which the several sections of the works are not connected by section bus bars. Fig. 4 is a similar view showing the means for disconnecting the isolating interrupter and the sectioning interrupter when the sections are connected by section bus bars.

In the case of a sub-station for transforming alternating current into continuous current each of the sections may comprise a certain number of motors (triphase current motors for example) which drive dynamos serving an appropriate number of feeders. The section represented in Fig. 3 comprises two triphase current motors 1 and 2 driving dynamos 3 and 4 provided in the usual manner with safety cut-outs 5. These dynamos supply their current to individual section bars 6 and 7 with which the feeders 10 that they serve are connected. The bars 6 and 7 are also connected with exchange bars, 8, 9 or discharge bars from the battery of accumulators 11 by conductors 12, 13 in which an automatic isolating interrupter 14 is interposed, its controlling solenoid 15 being mounted in the circuit of a battery of auxiliary cells 16. This circuit comprises a reversing relay 17, the controlling coil of which is branched off a shunt 18 interposed in the conductor 13; this relay closes only upon the passage of a current in the direction indicated by the arrow 19. The circuit of the battery 16 bifurcates into two other circuits 20 and 21 each comprising a maximum relay 22 and 23, the controlling coil of which is connected with the terminals of a shunt interposed in the section bar 6. Owing to the arrangement of these relays which only close the circuit of the battery 16 when one or other of the dynamos 3 and 4 is overloaded the isolating interrupter 14 remains closed normally notwithstanding the passage of a current circulating in the direction of the arrow 19 for charging the battery 11. In case of accident producing overloading of the dynamos 3 and 4 the relays 22 and 23 close in their turn and the battery 16 sends its current into the solenoid 15 to open the isolating interrupter 14.

Assuming as is the case in the arrangement illustrated in Fig. 1 that the four dynamos $a\ b\ c\ d$ of the station are connected by the intermediary of automatic isolating interrupters $e\ f\ g\ h$ with the exchange bar $i$ of the battery of accumulators $k$ without being connected one with the other by section bus bars and that at the moment under consideration the four dynamos are running to supply the mains, if for any reason one of the dynamos (the dynamos $c$ for example) should stop, the three interrupters $e\ f\ h$ open immediately in the manner described so as to interrupt the connection between the corresponding dynamos $a\ b\ d$ and the exchange bar of the battery $k$ which is then able to send its current without obstacle in to the defective section $c$. The objection might be raised that it would not appear to be desirable to throw all the power of the battery of accumulators upon a defective section which has produced an overload on its generator. This would be correct if an accident had happened at the same time to all the feeders supplied by this section but this is a very improbable case. Considering then the most general case of accident, such as a short-circuit, arising to one only of the feeders of the section, it is desirable to continue to supply the other feeders served by the same dynamo. It is true that the defective feeder will receive a large supply of current from the battery of accumulators, but this supply will only be momentary, because it must not be forgotten that all the feeders are provided with the ordinary means of protection, which are of course not done away with although they are not referred to herein because they form no part of the invention and they are represented diagrammatically on the drawings for the sake of clearness. The supply of the defective feeder will take place only during the time required for the operation of the maximum interrupters or fuses, which separate the defective feeder from the other feeders of the section. The invention has for its object to provide the sound feeders of this section with current by the battery of accumulators and not by the adjacent machines which might themselves become overloaded. This being stated, assuming that at the moment of the accident two of the sections ($a$ and $c$ for example) are sufficient for supplying the mains, as a result of the stoppage of the dynamo $c$ the dynamo $a$ will be overloaded and its isolating interrupter $e$ will open while the interrupters $f$ and $h$ of the sections $b$ $d$ which were supplied by the sections $a$ and $c$ and in which the current was consequently directed from the exchange bar $i$ toward the mains will remain closed so that the battery of accumulators which has to serve for supplying the three sections $b$ $c$ $d$ will be overloaded and its protection devices $t$ will be disconnected in their turn. According to the present invention this defect is avoided by connecting the several sections of the station by bus bars $l$ provided with automatic sectioning interrupters $m$, $n$, $o$, $p$, as shown in Fig. 2. In addition the circuits which include the disconnecting solenoids of the isolating interrupters $e$, $f$, $g$, $h$, are branched upon a multiple line $s$ common to all the sections and on which are also branched the disconnecting circuits of the sectioning interrupters $m$, $n$, $o$, $p$ controlled by maximum relays branched on the connection of the generators to the bus bars. As will be hereinafter explained the arrangement is such that when one of said maximum relays has operated, that is, when one of the dynamos of the installation is overloaded, the line $s$ will be immediately connected to an auxiliary battery of cells or other source of current so as to permit of the operation of any one of the interrupters. The battery of cells which controls the disconnection of these interrupters is interposed in a circuit which can only be closed when the corresponding dynamo is running so that if an accident should happen to one of the running dynamos (the dynamo $c$ for example) the sectioning interrupters $n$ $p$ corresponding to the stopped dynamos remain closed which enables the dynamo $a$ to send through the interrupter $n$ a current circulating in the direction of the arrow $r$ in such a manner as to disconnect the isolating interrupter $f$. Current is also sent through $e$ in the direction of the arrow $r$ and the circuit breaker $e$ is also consequently disconnected. In this manner the battery of accumulators $k$ is only caused to furnish its current to the damaged section and to those sections which by the closing of the interrupter $p$ really form part of this section, all the other sections of the installation automatically isolating themselves from the battery of accumulators. This arrangement is illustrated with more details in Fig. 4.

The dynamos 3 and 4 of each section are connected to section bus bars 6 and 7 preferably mounted ring-fashion and provided with automatic section interrupters 24. The maximum relays 22 and 23 of these dynamos are connected by the circuits 20 and 21 to the conductors 27 and 28 of a general line 26, 27, 28. The ends of the circuit of a battery of cells 16 are fixed to the conductors 27 and 28; this battery serves for the entire installation. This circuit comprises a solenoid 29 serving to control an interrupter 30 which permits of interposing the battery 16 in the circuit of the general conductors 26 and 28. The circuit of the disconnecting solenoid 15 of the isolating interrupter 14, which contains the reversing relay 17, and the circuit of the disconnecting solenoid 25 of the section interrupter 24, in which the locking contacts 31 and 32 are inserted, are both branched off the conductors 26 and 28. The latter may consist of a leaf spring or other similar part which is pressed against a fixed contact by a pin fitted to the safety cut-out 5 of the dynamo, or to the switch of its excitation circuit, in such a manner that contact is made only when this switch is closed. As it is obvious that when the machine is stopped these switches are held open, the releasing circuit of any one of the sectioning switches can only be closed when the corresponding dynamo is running. In these conditions if the dynamo or dynamos should be overloaded for any reason the relays 22 and 23 act and close the circuit of the battery 16; the solenoid 29 is thus energized and attracts its armature 30 in such a manner as to interpose the battery in the circuit of the general conductors 26 and 28. The two locking contacts 31 and 32 or one of them only being closed owing to the operation of the dynamos 3 and 4 or of one of them only a current is then sent into the solenoid 25 to open the section interrupter 24. If the dynamos of the adjacent section (for example the left hand section in Fig. 4) are not running no current can be sent into the corresponding solenoid 25 owing to the opening of these locking contacts and this section will consequently remain connected with the first by the section bus bars 6 and 7. In the two sections under consideration the current will then be directed in the direction of the arrow 19 in such a manner that the corresponding reversing relays 17 will close and permit of the passage of the current from the battery 16 through the solenoids 15 for opening the isolating interrupters 14 of each of these sections.

It will of course be understood that the invention is not limited to the examples described and represented as various modifications of a secondary nature can be made without thereby departing from the principle of the invention.

What I claim and desire to secure by Letters Patent of the United States is:—

1. In an electric supply system, in combination with the generators, bus bars between the generators and the feeders, sectioning interrupters in said bus bars, means acting on said sectioning interrupters for automatically sectioning the installation in case of overload of a generator, an auxiliary source of current supply in parallel with the generators, isolating interrupters between the auxiliary source and the bus bars in each section formed between two consecutive sectioning interrupters, connections between the tripping devices of all the interrupters, and connections between the tripping circuits of the sectioning interrupters and the safety interrupters of the generators for the purpose of automatically isolating the sections served by running generators in case of overload of a generator and supplying the current from the auxiliary source to the defective section only.

2. In an electric supply system, in combination with the generators, bus bars between the generators and the feeders, sectioning interrupters in said bus bars, means acting on said sectioning interrupters for sectioning the installation in case of overload of a generator, a battery of accumulators in parallel with the generators, an isolating interrupter arranged in the connections of each section with said battery of accumulators, connections between the tripping devices of all the interrupters, and connections between the tripping circuits of the sectioning interrupters and the safety interrupters of the generators for the purpose of automatically isolating the sections served by running generators in case of overload of a generator and supplying the current from the battery of accumulators to the defective section only.

3. In an electric supply system, in combination with the generators, bus bars conducting current to the feeders, connections between the generators and the bus bars, sectioning interrupters in said bus bars, a battery common to all the sections, a general multiple line connected to said battery, maximum current relays controlled by the current of the connections between the generators and the bus bars and branched upon said general multiple line to energize this line in case of overload of a generator, solenoids controlling said sectioning interrupters and branched upon said general multiple line for automatically sectioning the bus bars in case of overload of a generator, a battery of accumulators in parallel with the generators, an isolating interrupter in the connection of each section with said battery of accumulators, connections between the tripping devices of said isolating interrupters and the general multiple line, and connections between the tripping circuits of the sectioning interrupters and the safety interrupters of the generators for the purpose of automatically isolating the sections served by running generators in case of overload of a generator and supplying the current from the battery of accumulators to the defective section only.

4. In an electric supply system, in combination with the generators, bus bars conducting current to the feeders, connections between the generators and the bus bars, safety interrupters in said connections, sectioning interrupters in said bus bars, tripping solenoids controlling said sectioning interrupters, a battery common to all the sections, a general multiple line connected to said battery, tripping circuits containing said tripping solenoids and branched upon said general multiple line, locking contacts inserted in the tripping circuits and actuated by said safety interrupters so as to allow of the closing of the tripping circuit only when the corresponding generator is running, maximum current relays controlled by the current passing through the connections between the generators and the bus bars and branched upon said general multiple line to energize this latter in case of overload of a generator, a battery of accumulators in parallel with the generators, an isolating interrupter in the connection of each section with said battery of accumulators and connections between the tripping devices of said isolating interrupters and the general line.

5. In an electric supply system, in combination with the generators, bus bars conducting current to the feeders, connections between the generators and the bus bars, safety interrupters in said connections, sectioning interrupters in said bus bars, tripping solenoids controlling said sectioning interrupters, a battery common to all the sections, a general multiple line connected to said battery, tripping circuits containing said tripping solenoids and branched upon said general multiple line, locking contacts inserted in the tripping circuits and actuated by said safety interrupters so as to allow of the closing of the tripping circuit only when the corresponding generator is running, maximum current relays controlled by the current passing through the connections between the generators and the bus bars and branched upon said general line to energize this latter in case of overload of a generator, a battery of accumulators in parallel with the generators, an isolating interrupter in the connections of each section with said battery of accumulators, a tripping winding controlling said isolating interrupter, a tripping circuit branched upon said general multiple line and containing said tripping winding, and a reversing current relay controlled by the current through the connections between the battery of accumulators and the bus bars, said reversing current relay being adapted to be automatically actuated by a current flowing from the bus bars to the accumulators when the maximum relay of any overloaded section has operated to close the circuit of the tripping winding and so isolate from the battery of accumulators the section served by running generators in case of overload of a generator in order that the current of said accumulators may be supplied to the defective section only.

In testimony whereof I affix my signature in presence of two witnesses.

EDWIN BRANDENBURG.

Witnesses:
H. J. E. KIRKPATRICK,
CHAS. ROY NASMITH.